US009739681B2

(12) United States Patent
Landmann

(10) Patent No.: US 9,739,681 B2
(45) Date of Patent: Aug. 22, 2017

(54) SYSTEMS AND METHODS FOR ELECTRICALLY IDENTIFYING AND COMPENSATING INDIVIDUAL PRESSURE TRANSDUCERS

(71) Applicant: KULITE SEMICONDUCTOR PRODUCTS, INC., Leonia, NJ (US)

(72) Inventor: Wolf Landmann, Fair Lawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 174 days.

(21) Appl. No.: 14/527,069

(22) Filed: Oct. 29, 2014

(65) Prior Publication Data

US 2016/0123766 A1 May 5, 2016

(51) Int. Cl.
*G01L 5/24* (2006.01)
*G01L 19/08* (2006.01)
*G01L 9/02* (2006.01)
*G01D 21/00* (2006.01)

(52) U.S. Cl.
CPC .......... *G01L 19/083* (2013.01); *G01D 21/00* (2013.01); *G01L 9/025* (2013.01)

(58) Field of Classification Search
None
See application file for complete search history.

(56) References Cited

U.S. PATENT DOCUMENTS

| 6,867,595 B2* | 3/2005 | Chen ................. G01R 31/3665 320/132 |
| 6,924,649 B2* | 8/2005 | Knoedgen ............. G01D 3/021 324/525 |
| 7,024,539 B2* | 4/2006 | Bresemann ........... G06F 9/4411 712/36 |
| 7,539,784 B2* | 5/2009 | Lee ....................... G06F 3/0607 710/16 |
| 7,651,267 B2* | 1/2010 | Gonzales ............... G01K 1/024 324/260 |
| 8,175,839 B2* | 5/2012 | Kurtz ...................... G01D 1/00 702/138 |
| 8,209,151 B2* | 6/2012 | Gruaz .................... G01D 3/022 702/104 |

(Continued)

*Primary Examiner* — Peter Macchiarolo
*Assistant Examiner* — Jermaine Jenkins
(74) *Attorney, Agent, or Firm* — Troutman Sanders LLP; James E. Schutz; Mark Lehi Jones

(57) ABSTRACT

Certain implementations of the disclosed technology may include systems, methods, and apparatus for assigning a distinct identifier (ID) to a pressure transducer based on resistor values. Embodiments include electrically identifying the distinct ID, and compensating the pressure transducer based on the distinct ID. According to an example implementation, a method is provided that can include coupling a transducer ID measurement assembly with a transducer assembly; measuring, by the transducer ID measurement assembly, a plurality of divided voltages between a plurality of configurable ID switches and a reference resistor; determining, with a processor, a distinct ID associated with the transducer assembly based on the plurality of measured divided voltages; retrieving one or more compensation parameters based on the distinct ID; and compensating, with the one or more compensation parameters, a measurement signal of the transducer assembly.

23 Claims, 7 Drawing Sheets

(56) References Cited

U.S. PATENT DOCUMENTS

| | | | |
|---|---|---|---|
| 8,427,282 B2* | 4/2013 | Turner | G06K 7/0008 |
| | | | 340/10.4 |
| 8,810,267 B2* | 8/2014 | Wang | G01K 7/01 |
| | | | 324/721 |
| 8,821,012 B2* | 9/2014 | Wang | G01K 7/015 |
| | | | 324/750.15 |
| 2003/0005274 A1 | 1/2003 | Bresemann et al. | |
| 2005/0268000 A1 | 12/2005 | Carlson | |
| 2006/0179047 A1 | 8/2006 | Bresemann et al. | |
| 2007/0135934 A1 | 6/2007 | Lam | |
| 2011/0062240 A1 | 3/2011 | Anderson et al. | |
| 2012/0306505 A1 | 12/2012 | Kuo et al. | |
| 2015/0114128 A1* | 4/2015 | Norian | G01L 9/065 |
| | | | 73/708 |
| 2015/0289763 A1* | 10/2015 | Morshed | A61B 5/0015 |
| | | | 340/870.07 |

\* cited by examiner

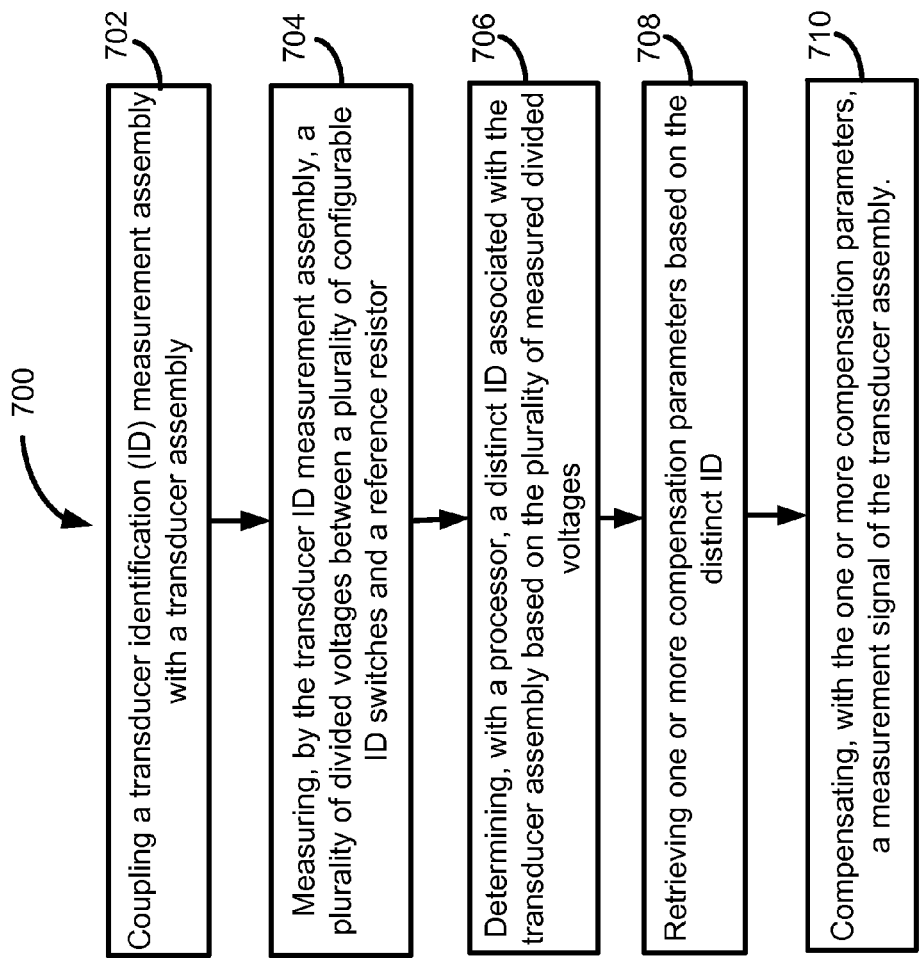

SYSTEMS AND METHODS FOR ELECTRICALLY IDENTIFYING AND COMPENSATING INDIVIDUAL PRESSURE TRANSDUCERS

FIELD

This disclosure generally relates to pressure transducers, and more particularly to systems and methods for uniquely identifying pressure transducers by electronically readable resistive elements.

BACKGROUND

In systems that utilize transducers for monitoring environmental conditions such as pressure and/or temperature, it is often desirable to determine the individual transducer identification (ID) information. The ID can be the serial number uniquely assigned to each transducer, and may be printed on the body of the transducer. Certain characteristics of the transducer are typically stored in a database (or look-up table) and are associated with the transducer serial number. The process of manually entering the serial numbers to retrieve the stored characteristic information is prone to human errors.

There are methods presently in use that allow an individual ID and other data to be associated with each transducer. For example, a system known as a Transducer Electronic Data Sheet (TEDS) includes a small memory chip that can be installed in each device and the memory can be addressed and read by an external reader using one or two additional conductors. The memory can store information besides the serial number, such as the part number, manufacturing date, last calibration date, pressure range, as well as individual coefficients which, when used with a polynomial function, may be used to reduce various errors associated with the transducer.

Transducers using TEDS have a limitation that they can be unreliable under certain conditions. For example, the TEDS electronics they may not survive high temperatures in excess of +125° C. Furthermore, the memory chip, being an active electronic device, may be susceptible to EMI, lightning or ESD. Another drawback to using memory chips for device ID is that, for certain applications, circuits that utilize digital and/or memory circuits need to be certified through a lengthy and costly procedure. There exists a need for systems and methods that can overcome these limitations and drawbacks.

SUMMARY

Some or all of the above needs may be addressed by certain implementations of the disclosed technology. Certain implementations of the disclosed technology may include systems, methods, and apparatus for assigning a distinct identifier (ID) to a pressure transducer based on resistor values. Example implementations may include electrically identifying the distinct ID, and compensating the pressure transducer based on the distinct ID.

A transducer assembly is disclosed herein, according to an example implementation. An example transducer assembly may include a transducer and a plurality of transducer ports coupled with the transducer. In certain example implementations, the transducer ports may include one or more of a ground return port, a voltage supply port, and/or a signal output port. In certain example implementations, a transducer assembly may include a plurality of individually interrogatable identification (ID) ports and a plurality of ID resistors. Each of the plurality of ID resistors are in communication with at least one of the transducer ports, which may be individually coupled to respective ID ports of the plurality of individually interrogatable ID ports. According to an example implementation of the disclosed technology, the plurality of ID resistors may be utilized as an identifier for a specific transducer.

A transducer identification (ID) measurement assembly is also disclosed herein, according to an example implementation. An example transducer ID measurement assembly may include a reference resistor and a plurality of selectable ID ports configured for communication with a respective plurality of ID resistors associated with a transducer. In certain example implementations, the plurality of ID resistors may represent an identifier of the specific transducer. In certain example implementations, the transducer ID measurement assembly may include a plurality of configurable ID switches, each in communication with the reference resistor and individually coupled to respective ID ports of the plurality of selectable ID ports. In certain example implementations, the transducer ID measurement assembly may further include transducer connection ports that may include one or more of a ground return connection port, a voltage supply connection port, and/or a signal connection port. The transducer connection ports are configured for coupling with the transducer. In certain example implementations, the transducer ID measurement assembly may be configured to measure and interpret a divided voltage between the plurality of configurable ID switches and the reference resistor.

Example implementations may include a system that combines the transducer assembly and the transducer identification measurement assembly, as individually described above.

According to an example implementation, a method is provided that can include coupling a transducer ID measurement assembly with a transducer assembly; measuring, by the transducer ID measurement assembly, a plurality of divided voltages between a plurality of configurable ID switches and a reference resistor; determining, with a processor, a distinct ID associated with the transducer assembly based on the plurality of measured divided voltages; retrieving one or more compensation parameters based on the distinct ID; and compensating, with the one or more compensation parameters, a measurement signal of the transducer assembly.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 7 is a flow diagram of a method 700 according to an example implementation.

DETAILED DESCRIPTION

Figure 1:
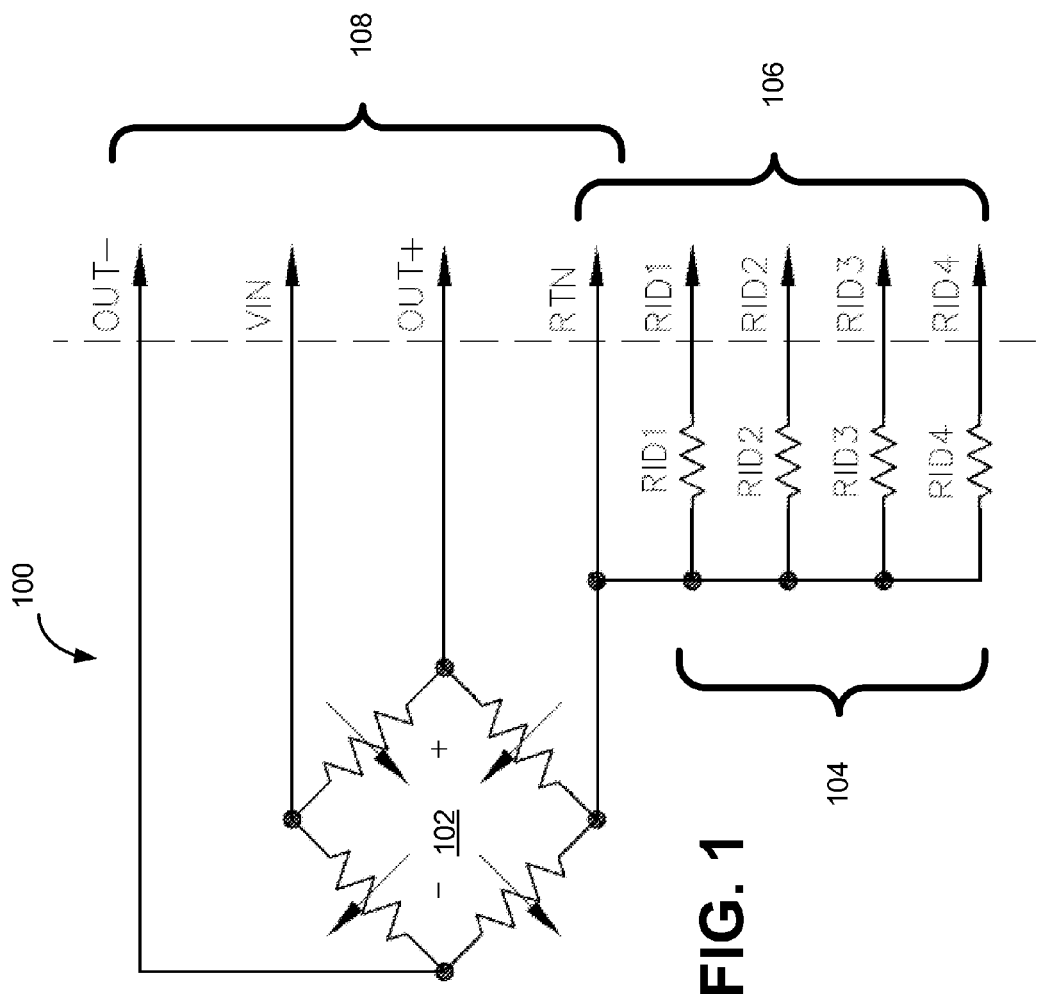
FIG. 1 depicts an example schematic diagram of a transducer circuit 100 including a transducer 102 and identification (ID) resistors 104, according to an example implementation.

The disclosed technology relates to systems and methods for assigning electronically distinct, readable, individualized identifications to individual pressure transducers. Certain example implementations may utilize a specific configuration of conductors and resistors to set an identification (ID) for each specific individual transducer. Certain example implementations of the disclosed technology may determine the transducer ID, for example, by reading (or otherwise sensing) resistance, voltage, and/or current based on the specific configuration of conductors, resistors, configurable switches, etc. Certain example implementations of the disclosed technology may include compensating the transducer based at least in part on the determined ID.

Various systems and methods are disclosed herein for assigning electronically readable IDs to pressure transducers. This disclosure describes embodiments in which IDs associated with a transducer can be automatically determined, for example, via an ID reading system and/or circuit connected to the transducer. Certain example implementations of the disclosed technology provide for electronically reading or determining the ID without additional human input. Certain embodiments are disclosed that enable reading the ID output of the transducer and determining the individual ID. Various example implementations are disclosed herein that may enable compensation of certain characteristics of the device to improve the accuracy of the transducer. For example, unwanted temperature-related responses in a pressure transducer may be eliminated or reduced by compensation, as will be discussed below in detail. Further example implementations are disclosed herein that may be utilized to compensate for lead wiring resistance, for example, when the transducer is connected to the ID reading system by a fairly long cable.

Certain example implementations of the disclosed technology provide for manufacturing transducers with distinct internal IDs, without requiring any active electronic memory circuits. Rather, the implementations disclosed herein may utilize passive resistive elements, selected and arranged to provide distinct combined resistance values that may be electronically interrogated and referenced to corresponding distinct IDs.

By utilizing passive resistive elements, example embodiments disclosed herein may provide the technical effect or benefit of being able to operate at elevated temperatures in excess of +125° C., wherein the traditional TEDS-type IDs with electronic memories may not be able to withstand such elevated temperatures. Additional technical benefits provided by the disclosed technology include transducers with distinct internal and readable IDs that are not susceptible to EMI, lightning or ESD. Another technical benefit is that the internal ID systems and methods disclosed herein do not require any certification. Yet another technical benefit of the disclosed technology is that internal ID systems and methods disclosed herein may be tamper proof. Certain example implementations of the disclosed technology may provide simpler and less expensive solutions compared with conventional transducers, while achieving a much better accuracy.

Identification Implementation

According to an example implementation of the disclosed technology, the ID of a transducer may be set by selecting and installing fixed resistors (ID resistors) such that the combined resistance values are different for each transducer. In accordance with an example implementation of the disclosed technology, the ID resistors may be connected using different topologies. Each connection topology and each set of ID resistors may be chosen to result in an individual ID. By using different connection topologies, the range of available IDs is greatly enhanced.

In accordance with a certain example implementation, an additional ID pin may be added with a jumper of 0Ω (short circuit) to compensate for the resistance of the wiring between the transducer and the measuring circuit (as will be discussed below with respect to FIG. 5). The connection topology of the jumper may also used in the calculation of the ID of the transducer.

Example Configuration

The following description and accompanying figures depict certain example implementations that utilize four (4) ID resistors and five (5) ID pins. The example configurations shown are for example and the number of ID resistors and ID pins may be more or less resulting in more or less respective possible ID codes, and requiring more or less respective ID resistors and pins.

Some implementations of the disclosed technology will be described more fully hereinafter with reference to the accompanying drawings. This disclosed technology may, however, be embodied in many different forms and should not be construed as limited to the implementations set forth herein.

FIG. 1 depicts an example schematic diagram of a transducer circuit 100 that includes a transducer 102, ID resistors 104, ID pins 106 and transducer voltage and signal pins 108, according to an example implementation. As depicted, the transducer circuit 100 comprises a Wheatstone-type sensing bridge transducer 102 as well as four additional ID resistors 104, RID1, R1D2, R1D3, and RID4. As shown in FIG. 1, the RTN pin may act as a reference for both the transducer 102 signal (OUT+, OUT−), voltage input (VIN), and the ID resistors 104.

The ID resistors 104, according to one example implementation, may be standard metal film type, 1% tolerance, with values between 10Ω and 499 kΩ. This example standard type, range of resistance, and accuracy may provide certain cost advantages. However, the disclosed technology is not limited to these example selections and other ranges and accuracies are also possible and contemplated.

According to an example implementation of the disclosed technology, each individual transducer circuit 100, by virtue of the distinct selection of the individual set of values for the ID resistors 104, may be set to have a different combined resistance (and hence, different ID) as compared with all other transducer circuits 100. For example, assuming that every second standard value for the resistors is selected, there are 48 possible values within each decade (10Ω to 99.9Ω, 100Ω to 999Ω, 1 kΩ to 9.99 kΩ, 10 kΩ to 99 kΩ) and 34 values for the range 100 kΩ to 499 kΩ, resulting in a total of 226 possible values for each ID resistors.

The list of standard resistor values between 100Ω and 999Ω is shown below in TABLE 1. For other decade ranges (e.g. 10Ω to 99.9Ω, or 1 kΩ to 9.99 kΩ, etc.) the values below should be multiplied or divided by 10, 100, 1000, etc.

TABLE 1

| | | | | | | | | | | | | | | |
|---|---|---|---|---|---|---|---|---|---|---|---|---|---|---|
| 100 | 102 | 105 | 107 | 110 | 113 | 115 | 118 | 121 | 124 | 127 | 130 | 133 | 137 | 140 | 143 |
| 147 | 150 | 154 | 158 | 162 | 165 | 169 | 174 | 178 | 182 | 187 | 191 | 196 | 200 | 205 | 210 |
| 215 | 221 | 226 | 232 | 237 | 243 | 249 | 255 | 261 | 267 | 274 | 280 | 287 | 294 | 301 | 309 |
| 316 | 324 | 332 | 340 | 348 | 357 | 365 | 374 | 383 | 392 | 402 | 412 | 422 | 432 | 442 | 452 |
| 464 | 475 | 487 | 499 | 511 | 523 | 536 | 549 | 562 | 576 | 590 | 604 | 619 | 634 | 649 | 665 |
| 681 | 698 | 715 | 732 | 750 | 768 | 787 | 806 | 825 | 845 | 866 | 887 | 909 | 931 | 953 | 976 |

By selecting for the ID resistors 104 every second standard value (e.g. 100Ω, 105Ω, 110Ω, 115Ω, 121Ω, etc., while skipping 102Ω, 107Ω, 113Ω, etc.) the values will differ by at least about 5%. Assuming that the actual ID resistors have a tolerance of ±1%, and the measuring system has an accuracy of better than ±1%, the system will be able to determine unambiguously the standard value for each ID resistor, as the difference between successive standard values is 5% and the total worst case error is ±1%±1%=±2%. In certain implementations, the accuracy of the resistance measurement may be better than ±1% in order to accurately measure the resistance of the bridge. This better accuracy of the resistance measurement may render the determination of the standard resistor value used for the ID resistors more reliable.

In accordance with an example implementation of the disclosed technology, and by extension of the various resistance combinations utilizing a total of 226 possible values for each of the four individual ID resistors, a total number of possible sets of resistors values may be $226^4$=2,608,757,776=2.61 Billion. In certain example implementations, each set of ID resistors 104 may be distinct and can be used as a distinct identifier for a particular transducer.

In accordance with an example implementation of the disclosed technology, a simple algorithm may be utilized to convert the set of resistor values into a number between 0 and 2.61 Billion. In an example implementation, this converted number may be used to represent the ID for a particular transducer. In one example implementation, the algorithm may assign a coefficient "c" between 0 and 225 to each possible resistor value from 10Ω to 499 kΩ. For example, the coefficient "c" corresponding to ID resistors may be illustrated as follows:

c=0 if the resistor=10Ω
c=1 if the resistor=10.5Ω
c=2 if the resistor=11Ω
c=3 if the resistor=11.5Ω
. . .
c=224 if the resistor=464 kΩ
c=225 if the resistor=487 kΩ

This may result in four coefficients $c_1$, $c_2$, $c_3$, and $c_4$ corresponding to the four ID resistors 104 (RID1, RID2, RID3 and RID4). The distinct ID of the transducer may then be represented by the algorithm:

$$ID = c_1 + c_2*226 + c_3*226^2 + c_4*226^3.$$

This algorithm may permit the calculation of the distinct ID from a set of four values of the ID resistors. Conversely, if the ID is known, the values of the ID resistors can be calculated. For example, the procedure may take the ID value (between 0 and 2,608,757,775), convert it into a four "digit" number in base 226, with the "digits" being the four coefficients $c_1$ (least significant), $c_2$, $c_3$, and $c_4$ (most significant). The resistances of the four ID resistors 104 can be determined from the four coefficients $c_1$, $c_2$, $c_3$, $c_4$ using the corresponding entries from TABLE 1 above.

TABLE 1 lists available resistors with 1% tolerance and having values between 100Ω and 999Ω. For other decade ranges, e.g. 10Ω to 99Ω, 1.0 kΩ to 9.9 kΩ, 10 kΩ to 99 kΩ or 100 kΩ to 999 kΩ, similar tables can be made by multiplying or dividing the values in TABLE 1 by 10, 100, 1000, etc. In certain example implementations, not all of the resistor values are required. For example, the choice of resistance values for the ID resistors may be selected between 10Ω and 499 kΩ, for example, to reduce the cost associated with such resistors, or to reduce the number of resistors that are needed to be stocked.

In one example implementation, every second resistance value may be omitted, thus the nominal resistors values may differ from each other by about 5% or more. As the actual resistance values may have a tolerance of ±1%, and considering a possible measurement error of ±1%, the measurement may unambiguously determine the correct nominal value. With these considerations, the complete table of resistance values for the ID resistors may be shown below in TABLE 1B.

TABLE 1B

| | | | | | | | |
|---|---|---|---|---|---|---|---|
| 10.0 | 10.5 | 11.0 | 11.5 | 12.1 | 12.7 | 13.3 | 14.0 | 14.7 |
| 21.5 | 22.6 | 23.7 | 24.9 | 26.1 | 27.4 | 28.7 | 30.1 | 31.6 |
| 46.4 | 48.7 | 51.1 | 53.6 | 56.2 | 59.0 | 61.9 | 64.9 | 68.1 |
| 100 | 105 | 110 | 115 | 121 | 127 | 133 | 140 | 147 |
| 215 | 226 | 237 | 249 | 261 | 274 | 287 | 301 | 316 |
| 464 | 487 | 511 | 536 | 562 | 590 | 619 | 649 | 681 |
| 1.00 k | 1.05 k | 1.10 k | 1.15 k | 1.21 k | 1.27 k | 1.33 k | 1.40 k | 1.47 k |
| 2.15 k | 2.26 k | 2.37 k | 2.49 k | 2.61 k | 2.74 k | 2.87 k | 3.01 k | 3.16 k |
| 4.64 k | 4.87 k | 5.11 k | 5.36 k | 5.62 k | 5.90 k | 6.19 k | 6.49 k | 6.81 k |
| 10.0 k | 10.5 k | 11.0 k | 11.5 k | 12.1 k | 12.7 k | 13.3 k | 14.0 k | 14.7 k |
| 21.5 k | 22.6 k | 23.7 k | 24.9 k | 26.1 k | 27.4 k | 28.7 k | 30.1 k | 31.6 k |
| 46.4 k | 48.7 k | 51.1 k | 53.6 k | 56.2 k | 59.0 k | 61.9 k | 64.9 k | 68.1 k |
| 100 k | 105 k | 110 k | 115 k | 121 k | 127 k | 133 k | 140 k | 147 k |

TABLE 1B-continued

| 215 k | 226 k | 237 k | 249 k | 261 k | 274 k | 287 k | 301 k | 316 k |
|---|---|---|---|---|---|---|---|---|
| 464 k | 487 k | | | | | | | |
| | | 15.4 | 16.2 | 16.9 | 17.8 | 18.7 | 19.6 | 20.5 |
| | | 33.2 | 34.8 | 36.5 | 38.3 | 40.2 | 42.2 | 44.2 |
| | | 71.5 | 75.0 | 78.7 | 82.5 | 86.6 | 90.9 | 95.3 |
| | | 154 | 162 | 169 | 178 | 187 | 196 | 205 |
| | | 332 | 348 | 365 | 383 | 402 | 422 | 442 |
| | | 715 | 750 | 787 | 825 | 866 | 909 | 953 |
| | | 1.54 k | 1.62 k | 1.69 k | 1.78 k | 1.87 k | 1.96 k | 2.05 k |
| | | 3.32 k | 3.48 k | 3.65 k | 3.83 k | 4.02 k | 4.22 k | 4.42 k |
| | | 7.15 k | 7.50 k | 7.87 k | 8.25 k | 8.66 k | 9.09 k | 9.53 k |
| | | 15.4 k | 16.2 k | 16.9 k | 17.8 k | 18.7 k | 19.6 k | 20.5 k |
| | | 33.2 k | 34.8 k | 36.5 k | 38.3 k | 40.2 k | 42.2 k | 44.2 k |
| | | 71.5 k | 75.0 k | 78.7 k | 82.5 k | 86.6 k | 90.9 k | 95.3 k |
| | | 154 k | 162 k | 169 k | 178 k | 187 k | 196 k | 205 k |
| | | 332 k | 348 k | 365 k | 383 k | 402 k | 422 k | 442 k |

Note:
the suffix "k" indicates that the value is in kΩ (×1000 ohms).

TABLE 1B includes 226 resistance values. According to an example implementation of the disclosed technology, a coefficient c may be assigned sequentially to each resistance value, from c=0 for the 10.0Ω resistance value, c=1 for 10.5Ω resistance value, . . . , and c=225 for 487 kΩ resistance value.

In accordance with an example implementation of the disclosed technology, one or more analytical functions may be utilized to relate the resistance values to the coefficients c. For example, the nominal resistance value R can be calculated from the coefficient c using the formula:

$$R = 10^{1+INT(\frac{c}{48})} * \text{ROUND}(1.049139729^{MOD(c,48)}, 2),$$

where INT(c/48) means integer division, i.e. the quotient only when c is divided by 48, and MOD(c,48) means the modulo division, i.e. the remainder of the division of c by 48, and ROUND(n,d) means the number n rounded to d decimal places.

Inversely, the coefficient c can be calculated from the resistance R using a coefficient determination formula:

$$c = \text{ROUND}\left(20.84613519 * \ln\frac{R}{10}, 0\right).$$

In accordance with an example implementation of the disclosed technology, the measuring circuit may measure the actual resistance of all the ID resistors and may be further utilized to calculate the corresponding coefficient c from the result of the measurement based on the coefficient determination formula (3) shown above. In certain example implementations, a microprocessor may be utilized to implement the coefficient determination formula.

According to an example implementation of the disclosed technology, the coefficient determination formula (3) may result in a correct coefficient even if all the various errors are considered. For example, using the coefficient determination formula for a nominal resistance of 10.5Ω should result in a coefficient of c=1. In certain example implementations, the actual measured resistance may be different due to various errors. For example, the actual resistor may differ from the nominal value by about ±1%. Additionally, temperature variations may induce an additional change in the resistance value of about ±0.75%. In certain example implementations, the measurement circuit may further introduce an error of ±0.25%. Considering all these errors and tolerances, in the worst case the measurement result may deviate from the nominal value by about ±1%±0.75%±0.25%=±2%, which for the nominal value of 10.5Ω could result in a measurement result ranging between about 10.29Ω and about 10.71Ω.

Using the coefficient determination formula to determine the coefficient c for any value between 10.29Ω and 10.71Ω will result in c=1. In fact, according to certain example implementations, applying the coefficient determination formula for any value between 10.243Ω and 10.746Ω may result in the calculated coefficient of c=1.

Basic Topology

Figure 2:
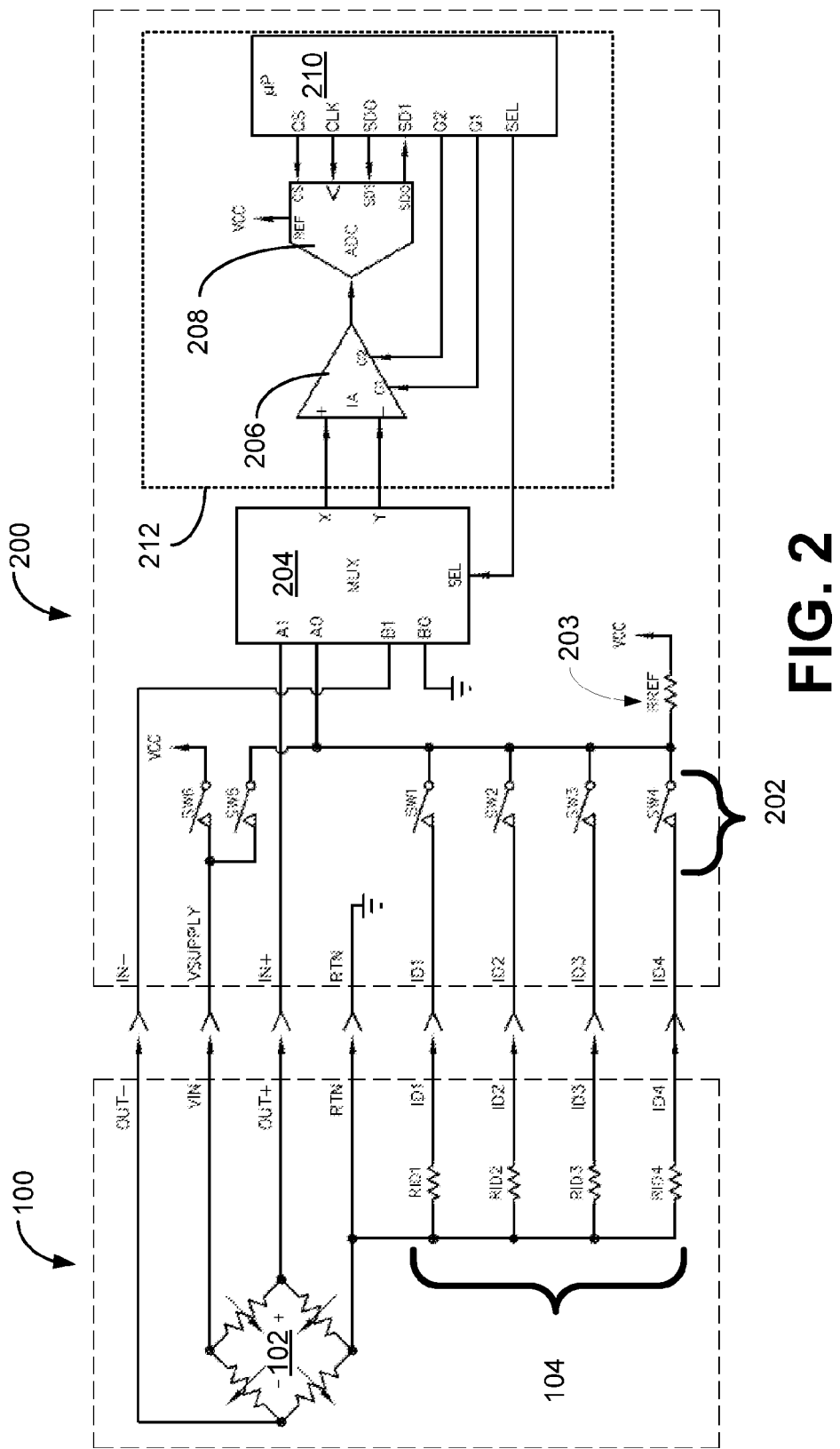
FIG. 2 depicts an example schematic diagram of a transducer circuit 100 (as shown in FIG. 1) coupled with an example measurement circuit 200, according to an example implementation.

FIG. 2 depicts an example schematic diagram of a transducer circuit 100 (as shown in FIG. 1) coupled with an example measurement circuit 200. It should be recognized that the measurement circuit 200, may be externally connected to the transducer circuit 100 via various pins (ID1-ID4, RTN, IN+ Vsupply, and IN−) and may not need to be in the same measurement environment of the transducer circuit 100.

In an example implementation, the measurement circuit 200 may include various switches 202 (SW1-SW6) for configuring the measurement circuit 200, selectively powering the transducer 102 (SW6) selectively reading the resistance values of the ID resistors 104 (SW1-SW4), and/or routing voltage (VCC) to the ID resistors 104 (SW5, SW6).

As depicted in FIG. 2, certain example implementations of the measurement circuit 200 may include a multiplexer circuit 204 for selectively reading the transducer 102 signal, or for selectively reading the ID resistors 104. Additional circuitry 212 may also be included, for example, such as a programmable amplifier 206, a analog-to-digital converter 208, and a microprocessor 210.

According to an example implementation of the disclosed technology, the measurement circuit 200 may further include a reference resistor RREF 203, for example, that may provide part of a voltage divider circuit in combination with the ID resistors 104 to facilitate reading a voltage level that corresponds to the resistor combination. For example, if only SW4 is closed, the voltage present at the A0 pin of the multiplexer 204 may be calculated as $$V_{A0} = V_{cc} * \frac{RID4}{RID4 + RREF}$$

Various combinations of the ID resistors 104 may be read through series and/or parallel combinations of the configurable switches 202, and the resistances may be calculated by knowing the value of the reference voltage VCC and the reference resistor RREF 203, as known to those having skill in the art.

Variable Topology

The number of possible sets of values, indicated above as 2.61 Billion, can be significantly increased by using different circuit topologies for the four ID resistors 104. Besides the basic topology shown in FIG. 1, the ID resistors 104 can be connected in different ways resulting in additional possible IDs.

Figure 3:
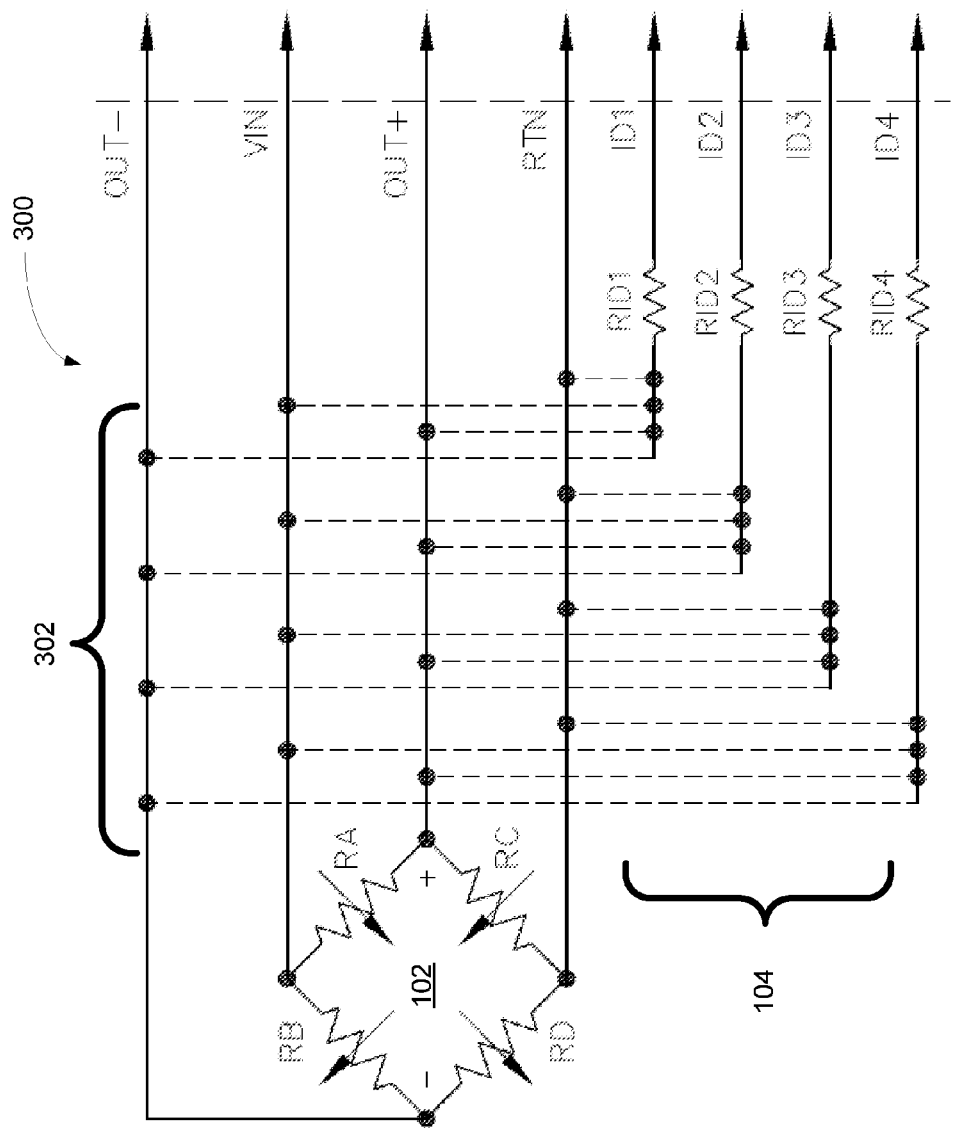
FIG. 3 depicts an example schematic diagram of a variable topology transducer circuit 300, according to an example implementation.

FIG. 3 depicts an example schematic diagram of a first variable topology transducer circuit 300, according to an example implementation. The dashed lines shown at the left end of each of the ID resistors (and the 0Ω jumper as shown in FIG. 5 and FIG. 6) represent four possible connections for each ID resistor (and 0Ω jumper). In an example implementation, one and only one of these four possible connections for each of the ID resistors 104 may be connected (or hardwired) in any given transducer. For example, the left end of the resistor RID1 may be connected either to RTN, or to VIN, or to OUT+, or to OUT−. In certain example implementations, the choice of connection used (topology) may determine the topology coefficient "t" for this ID resistor. The values of the topology coefficient "t" will be discussed below.

In the different topologies 302 (and as represented by the dashed connections among the transducer 102 connections and the ID resistors 104), each ID resistor may be selectively connected at one end to the corresponding ID pin, and the other end to either the RTN pin (basic topology), or to the VIN pin, or to the OUT+ pin, or to the OUT− pin. This results in four possible ways of connecting each resistor. For four ID resistors 104, the possible number of topologies is $4^4=256$.

Figure 4:
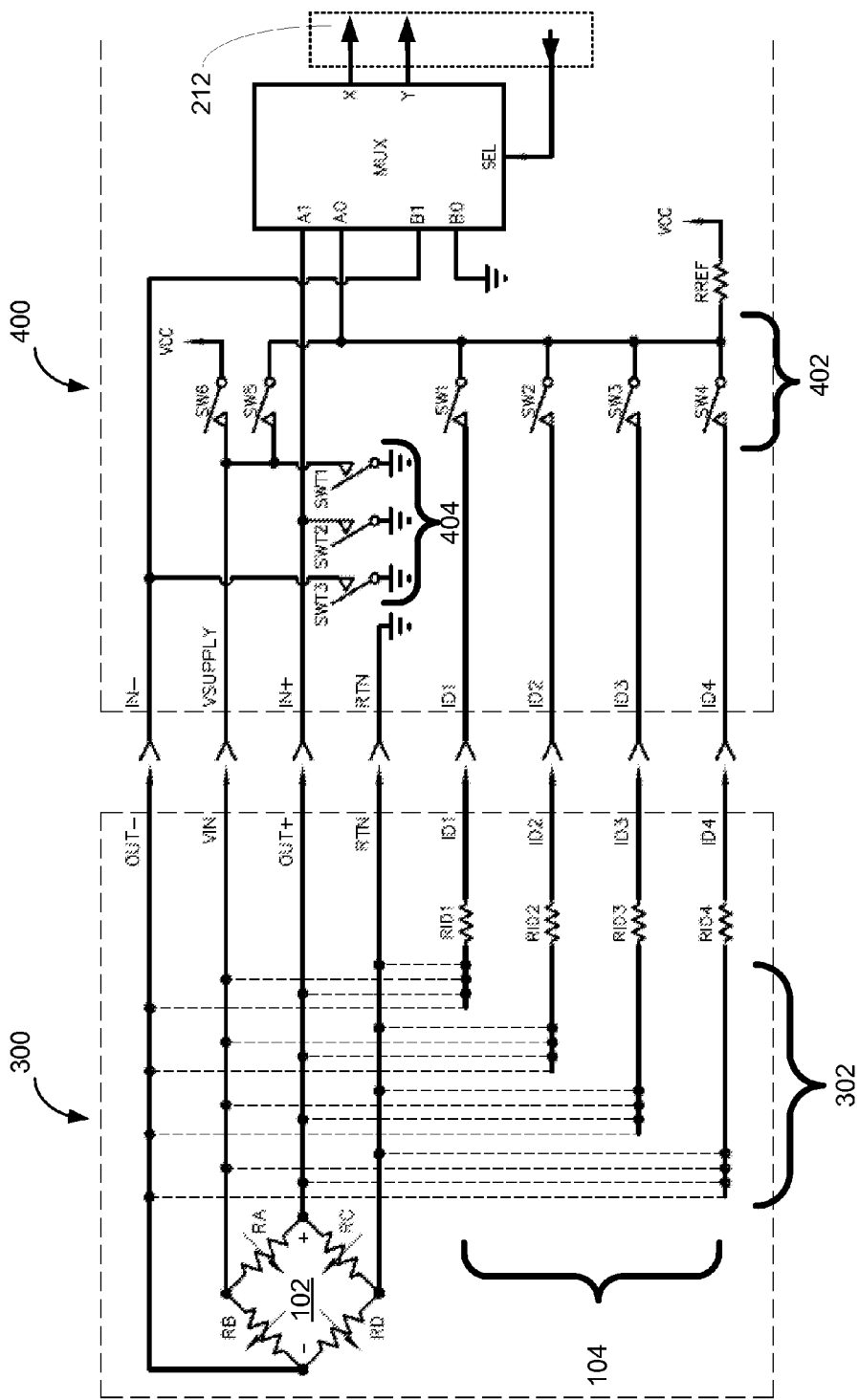
FIG. 4 depicts an example schematic diagram of a variable topology transducer circuit 300 (as shown in FIG. 3) coupled with another example measurement circuit 400, according to an example implementation.

FIG. 4 depicts an example schematic diagram of the first variable topology transducer circuit 300 (as shown in FIG. 3) coupled with another example measurement circuit 400, according to an example implementation. The measuring circuit 400 may identify the topology 302 of each ID resistor and its resistance value by selectively configuring the ID resistor detection switches 402 (SW1-SW4) and the bridge switches 404 (SWT1-SWT3) and by measuring the resistance between the ID pin and each of the other pins: RTN, VIN, OUT+, and OUT−. These four resistance measurements may result in either the real value of the resistor (if the correct connection pin is selected) or a value higher than the real value by an amount equal to either the bridge resistance or ¾ of the bridge resistance. The measurement resulting in the lowest value indicates the actual topology 302 of that resistor and the real value of that resistor.

In accordance with an example implementation of the disclosed technology, the switches 404 SWT1, SWT2 and SWT3 may be part of the measuring circuit. For example, they may be used to determine the actual topology used in the transducer and thus determine the topology code t for all the ID resistors 104 (and the 0Ω jumpers 504, as shown in FIG. 5 and FIG. 6).

According to an example implementation of the disclosed technology, the measuring circuit 400 may need to have a measurement accuracy better than 1% in order to distinguish between different possible values of the ID resistors and a resolution of better than ¾ of the minimum bridge resistance in order to distinguish between the different topologies 302. The worst case for the resolution requirement is when the ID resistor value is the highest, i.e. 487 kΩ(last value smaller than 499 kΩ). Assuming that the bridge resistance is between 1 kΩ and 5 kΩ, the resulting resolution requirement is 0.15% or better.

In accordance with an example implementation of the disclosed technology, each topology 302 can be assigned a code by assigning a topology coefficient "t" for each ID resistor 104 as follows:

t=0 if the resistor is connected to RTN
t=1 if the resistor is connected to VIN
t=2 if the resistor is connected to OUT+
t=3 if the resistor is connected to OUT−

This will result in four topology coefficients $t_1$, $t_2$, $t_3$, and $t_4$ corresponding to the four ID resistors RID1, RID2, RID3 and RID4. The ID of the transducer may then be calculated as:

$$ID=(c_1+c_2*226+c_3*226^2+c_4*226^3)*256+(t_1+t_2*4+t_3*4^2+t_4*4^3).$$

As a result, the total number of IDs which can be achieved using four ID resistors 104 with the variable connection topology 302 is 256×2,608,757,776≈668 Billion.

Interconnection Wire Resistance Compensation

If the physical distance between the measuring circuit and the transducer is large, e.g. 100 m, the resistance of the interconnecting wires may affect the result of the resistance measurement, as the interconnecting wires with an unknown resistance are in series with the resistance to be measured.

Figure 5:
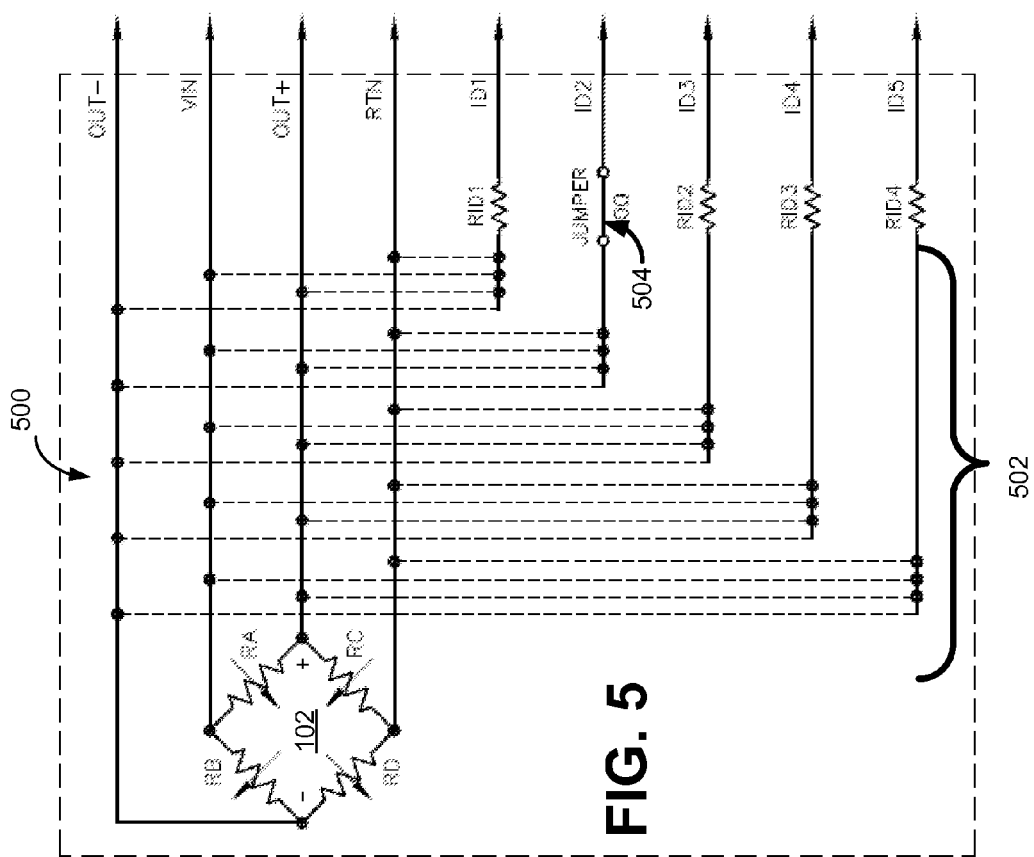
FIG. 5 depicts an example schematic diagram of another variable topology transducer circuit 500, according to an example implementation.
Figure 6:
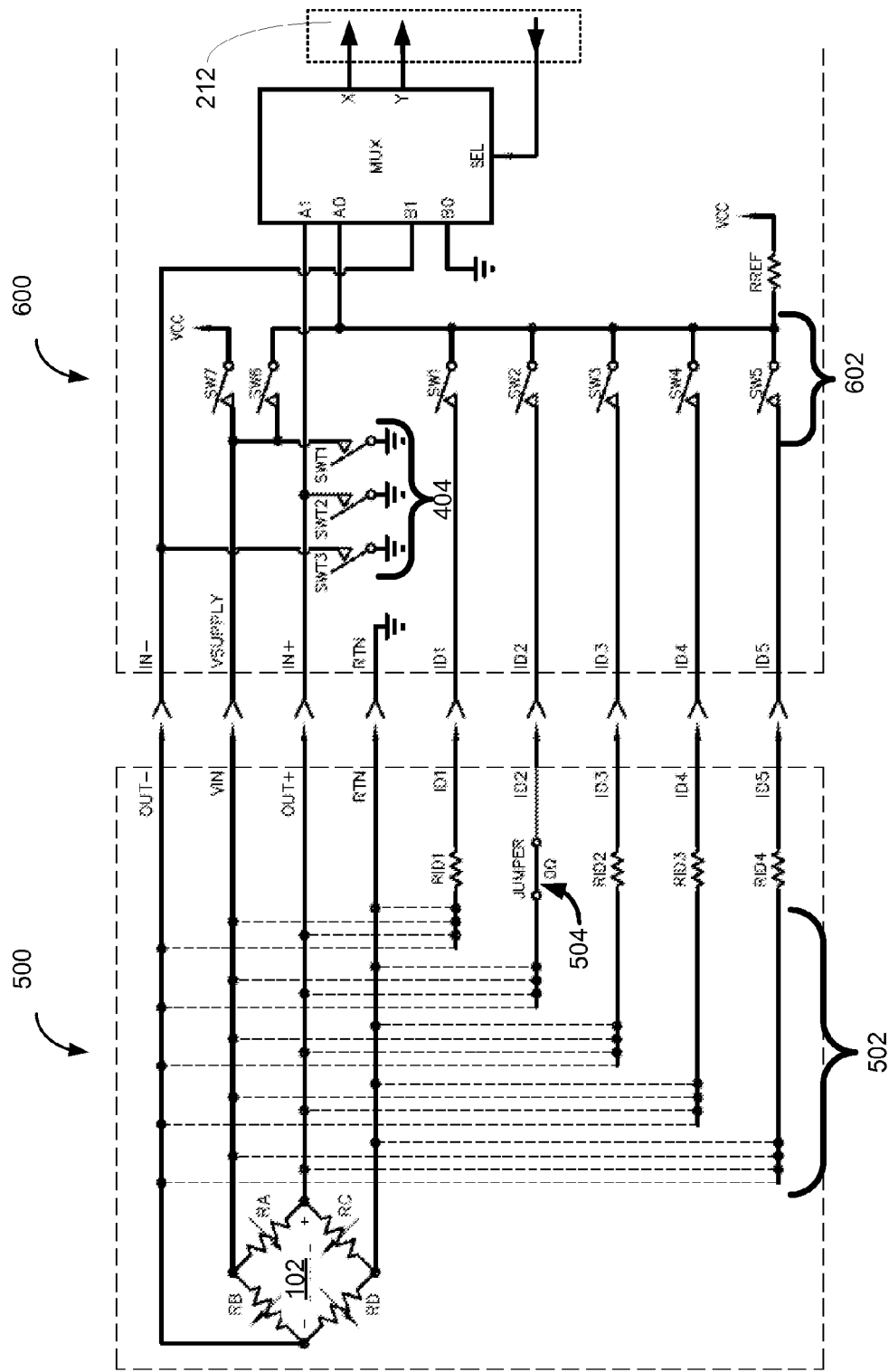
FIG. 6 depicts an example schematic diagram of a variable topology transducer circuit 500 (as shown in FIG. 5) coupled with an example measurement circuit 600, according to an example implementation.

FIG. 5 depicts an example schematic diagram of an interconnect resistance compensating variable topology transducer circuit 500, according to an example implementation, that may be utilized to compensate for the added resistance due to the interconnecting wires between the transducer and the measurement circuit. In this figure, a compensating jumper 504 is shown connected to the ID2 pin. The compensating jumper 504 may be connected to any of the five ID pins while the actual ID resistors may be connected to the remaining ID pins. FIG. 5 also depicts the various topologies 502 in a similar manner as discussed above with reference to topologies 302 shown in FIG. 3 and FIG. 4.

FIG. 6 depicts an example schematic diagram of the interconnect resistance compensating variable topology transducer circuit 500 (as shown in FIG. 5) coupled with an example measurement circuit 600 according to an example implementation. The example measurement circuit 600 is similar to the measurement circuit 400 (as shown in FIG. 4 and described above), but with an extra ID pin, switch, and associated circuitry resulting in a total of five ID pins (ID1-ID5) to accommodate the addition of the compensating jumper 504 in the transducer circuit 500. This extra ID pin and associated circuitry may be utilized to eliminate or significantly reduce the interconnect resistance error. FIG. 6 shows five ID resistor detection switches 602 (SW1-SW5), two additional routing switches (SW6 and SW7) for routing input voltage VCC to the resistor detection switches 602 (SW1-SW5), and the bridge switches 404 (SWT1-SWT3).

In an example implementation, a short circuit jumper (zero Ω) may be connected between one of the five ID pins at one end, and one of the remaining pins (RTN, VIN, OUT+ and OUT−) at the other end. These combinations result in an additional topology 502 and associated topology coefficient for the zero Ω resistor tz with 20 possible values between 0 and 19. The example values for the tz coefficient, depending on the possible connections of the 0Ω jumper 504 are shown below in TABLE 2:

TABLE 2

|      | ID1 | ID2 | ID3 | ID4 | ID5 |
|------|-----|-----|-----|-----|-----|
| RTN  | 0   | 1   | 2   | 3   | 4   |
| VIN  | 5   | 6   | 7   | 8   | 9   |
| OUT+ | 10  | 11  | 12  | 13  | 14  |
| OUT− | 15  | 16  | 17  | 18  | 19  |

In an example implementation, the measurement circuit 600 (as shown in FIG. 6) may selectively configure the five ID resistor detection switches 602 (SW1-SW5), the two additional routing switches (SW6 and SW7), and/or the bridge switches 404 (SWT1-SWT3), for example, to individually measure the resistance associated with each of the ID pins under different combinations. In an example implementation, the measurement combination resulting in the lowest measured resistance for a given pin (ID1-ID5) may be assigned as the resistance for that particular pin and associated wiring. The measurement circuit 600 may also determine the topology 502 of the zero Ω jumper 504 and therefore the topology coefficient tz.

In accordance with an example implementation of the disclosed technology, all other resistance measurements—ID resistors and bridge resistance—may then be reduced by the value of the resistance of the wiring. This correction may be based on the assumption that the resistance of all wires between the transducer and the measuring circuit are the same or very close.

Adding the topology coefficient tz for the reference resistor, the ID becomes:

$$ID=[(c_1+c_2*226+c_3*226^2+c_4*226^3)*256+(t_1+t_2*4+t_3*4^2+t_4*4^3)]*20+tz.$$

The description above refers to the case when four ID resistors and five ID pins are used. If a different number of resistors and ID pins are used the total number of possible ID values are as follows:

With one ID resistor and two ID pins the total number of possible ID values is 7232. With two ID resistors and three ID pins the total number of possible ID values is 9.8 Million. With three ID resistors and four ID pins the total number of possible ID values is 11.8 Billion. With four ID resistors and five ID pins the total number of possible ID values is 13.4 Trillion. With five ID resistors and six ID pins the total number of possible ID values is 142 Quadrillion.

Measurement Circuits

According to certain example implementations of the disclosed technology, the various measurement circuits (200, 400, 600) disclosed herein may include various switches (202, 402, 404, 602) such as SW1 through SW7 and SWT1, SWT2 and SWT3 and associated switching networks, for example that utilize a multiplexer MUX 204. The switches (202, 402, 404, 602) for example, are shown in the schematics as mechanical On/Off switches; but they can be implemented as MOSFET or other electronic switching devices.

In accordance with an example implementation of the disclosed technology, the ADC 208 may measure the output of the sensing bridge transducer 102 and also the voltage output of a resistive divider formed by the reference resistor RREF 203 and a resistor to be measured selected by the switching network. The later voltage measurement will enable the calculation of the values of the ID resistors and the determination of the connection topology used.

As discussed above, the measurement of the ID resistors 104 may be accomplished by selectively configuring the switching network, which may ultimately form a resistive divider comprising a reference resistor RREF 203 and the particular ID resistor 104 to be measured. Assuming that the value of RREF 203 is known, then the value of the ID resistor 104 can be calculated from the value of the output voltage of this resistive divider.

When using the interconnect resistance compensating variable topology transducer circuit 500, according to an example implementation, five resistance measurements for each of the ID pins (ID1-ID5) may be made, and the lowest value may be assigned to the wiring resistance. The other four values, minus the wiring resistance, may be assigned to the four ID resistors, in the order of their corresponding ID pins, while skipping the pin with the lowest resistance.

In certain example implementations, the ADC 206 (for example, as explicitly shown in block 212 of FIG. 2, and implicitly in FIGS. 4 and 6) may include variable gain and offset (in discrete steps) in order to achieve maximum accuracy and resolution of the voltage and resistance measurement. The ADC 206 and the switching network may also determine the resistance of the sensing bridge transducer 102 using the same method as for the ID resistors. According to an example implementation of the disclosed technology, the result may be corrected for the wiring effects by subtracting the wiring resistance.

In accordance with an example implementation of the disclosed technology, the resistance of the sensing bridge transducer 102 may be used as an indication of the actual temperature of the sensing bridge transducer 102, which then can be used to compensate the temperature effects of the sensing bridge.

In certain example implementations, the various measurement circuits (200, 400, 600) disclosed herein may include a microprocessor (µP) 210, which may control the ADC 208, the switches (202, 402, 404, 602), and/or the gain and offset of the ADC 208. For clarity, the control lines from the µP 210 to the switches (202, 402, 404, 602), are omitted in the schematics. In certain example implementations, the µP 210 may be utilized to implement the coefficient determination formula.

In accordance with an example implementation of the disclosed technology, the calculated ID of the transducer 105 may be utilized by the µP 210 to retrieve a table of coefficients associated with this particular ID. In an example implementation, the µP 210 may measure the output voltage and the resistance of the sensing bridge transducer 102. In an example implementation, the µP 210 may calculate the actual pressure applied to the transducer 102 from the output voltage, by applying corrections based on the resistance of the transducer 102 and the retrieved table of coefficients that are based on the determined ID.

Measurement Modes and ID Calculation

Referring again to FIG. 6, the different measuring modes and status of the switches 602 is shown in TABLE 3 below. According to an example implementation of the disclosed technology, at any time only one of the switches 602 SW1 to SW7 is closed and only one or none of the switches 404 SWT1, SWT2, SWT3 is closed.

TABLE 3

| Measurement | SW1 to SW6 closed | MUX SEL | SWT1 to SWT3 status |
|---|---|---|---|
| Pin ID1 | SW1 | 0 | See below |
| Pin ID2 | SW2 | 0 | See below |
| Pin ID3 | SW3 | 0 | See below |
| Pin ID4 | SW4 | 0 | See below |

TABLE 3-continued

| Measurement | SW1 to SW6 closed | MUX SEL | SWT1 to SWT3 status |
|---|---|---|---|
| Pin ID5 | SW5 | 0 | See below |
| Bridge resistance | SW6 | 0 | All open |
| Bridge output voltage | SW7 | 1 | All open |

In accordance with an example implementation, the resistance associated with each of the five ID pins (ID1-ID5) may be—measured four times: first with all bridge switches 404 (SWT1 to SWT3) open, then by successively closing only one of these bridge switches 404. The measurement resulting in the lowest value may indicate the actual value of that ID resistor 104 or jumper 504, and also the topology coefficient "t" for that ID pin. For example, while selecting pin ID4 by closing switch SW4, if the measurement result with SWT2 closed is the lowest, then this is the value associated with pin ID4 and $t_4=2$. If all four measurements are equal (i.e. within the resolution of the measurement) then t=0.

From the five resistance measurements for the corresponding five ID pins (ID1-ID5), the measurement resulting in the lowest resistance value may be assigned to the interconnect wiring resistance. For example, if lead wiring is utilized to connect between the transducer circuit 500 and the measurement circuit 600, the resistance of the lead wiring may be determined as the lowest measured resistance value. In an example implementation, this wiring resistance may be subtracted from the other four measurements, and the results may be assigned to the four ID resistors 104. From the values of the ID resistors 104, the resistor codes c1, c2, c3, and c4 can be calculated.

For example, the topology code for the 0Ω jumper tz can be calculated as follows:

$$tz=4*t+(\text{ID pin number}-1),$$

where t is the topology coefficient for the pin identified with the lowest resistance. From the four resistance coefficients $c_1$, $c_2$, $c_3$, and $c_4$, the four topology coefficients $t_1$, $t_2$, $t_3$, and $t_4$, and the 0Ω resistor topology coefficient tz, the ID of the transducer can be calculated as follows:

$$ID=[(c_1+c_2*227+c_3*227^2+c_4*227^3)*256+(t_1+t_2*4+t_3*4^2+t_4*4^3)]*20+tz.$$

Pressure Calculation and Digital Temperature Compensation

Assuming a perfect transducer 102, the pressure exerted on the transducer 102 can be calculated using the following formula:

$$p=S*v,$$

where p is the pressure, S is the sensitivity of the transducer 102 and v is the dimensionless ratio Vout/Vin, where Vin and Vout are respectively the input and output voltages of the transducer 102. The ratio v may correspond to the output of the ADC 208, scaled from 0 to the maximum count of the ADC 208. For example, for a 16 bit ADC 208, the variable v is scaled to the range 0 to 65,535.

In an example implementation, the offset (non-zero output voltage at zero pressure) of the transducer 102 may be included in the pressure formula as follows:

$$p=Z+S*v,$$

where the factor Z (zero) accounts for the offset of the transducer. In situations where a non-linearity of the transducer 102 is also a factor, a linearity correction factor L may be added, and the resulting pressure formula becomes:

$$p=Z+S*v+L*v^2. \quad \text{(Equation 1)}$$

The factors Z, S and L may change with temperature in a different way for each transducer. In certain example implementations, these factors may be utilized for correcting or compensating the response of the transducer 102.

For each individual sensor, the factors Z, S and L can be calculated as polynomials. In certain example implementations, the factors may be a function of temperature. In certain example implementations, the temperature of the transducer 102 may be indicated by the bridge resistances of the transducer 102. For example, the is the sensitivity of the transducer 102 may be expressed as:

$$S=s_0+s_1*r+s_2*r^2+s_3*r^3+s_4*r^4, \quad \text{(Equation 2)}$$

where r is the bridge resistance, indicating the temperature of the sensor, and $s_0$, $s_1$, $s_2$, $s_3$, $s_4$ are constant coefficients, individual for each sensor. Similar formulas may apply for the zero factor Z and the non-linearity correction factor L as follows:

$$Z=z_0+z_1*r+z_2*r^2+z_3*r^3+z_4*r^4, \quad \text{(Equation 3)}$$

$$L=l_0+l_1*r++l_2*r^2. \quad \text{(Equation 4)}$$

Usually, the polynomial for the non-linearity factor L is of a lower order due to the (typically) small non-linearity of the sensor.

In accordance with an example implementation of the disclosed technology, the microprocessor μP 210 may retrieve the value v (ratio of Vout/Vin) from the ADC 208 during the transducer 102 bridge output voltage measurement. The μP 210 may calculate the bridge resistance r from the transducer 102 bridge resistance measurement. Using the ID of the transducer the μP 210 may also retrieve an individual digital file containing the coefficients $s_0$, $s_1$, $s_2$, $s_3$, $s_4$, and $z_0$, $z_1$, $z_2$, $z_3$, $z_4$, and $l_0$, $l_1$, $l_2$. Using the bridge resistance r and the coefficients from the file the μP 210 may calculate the coefficients S, Z and L using Equations 2, 3, and 4 above. From the coefficients S, Z and L by using Equation 1, the pressure p may be calculated by the μP 210.

In certain example implementations, the file with the individual coefficients may generated by the manufacturer of the transducer 102, for example by measuring the transducer 102 at different pressures and temperatures. In one example implementation, the name of the file (or part of it) may be the actual ID of the transducer 102. In certain example implementations, the file may be posted on a manufacturer's website, along with other similar files for each individual transducer manufactured. For example, the μP 210 in the customer's installation may be configured to automatically retrieve this specific file using the ID of the transducer 102.

Temperature Measurement

In accordance with an example implementation of the disclosed technology, the measuring circuits and associated switches, etc., as shown and disclosed herein, may also be utilized to determine the temperature of the sensor without any additional circuitry. The resistances r associated with the transducer 102 bridge, for example, may be strongly dependent of the temperature, and therefore the temperature may be determined from the bridge resistance r. In certain instances, temperature T may be a non-linear function of the bridge resistance r and can be calculated using the following formula:

$$T=k_0+k_1*r+k_2*r^2+k_3*r^3.$$

The temperature coefficients $k_0$, $k_1$, $k_2$, and $k_3$ can be determined when the transducer 102 is manufactured. In certain example implementations, the temperature coefficients $k_0$, $k_1$, $k_2$, and $k_3$ may be stored in the file associated with the particular transducer 102, identified by the ID, and retrieved from the manufacturer of the transducer 102.

FIG. 7 is a flow diagram of a method 700, in accordance with an example implementation of the disclosed technology. In block 702, the method 700 includes coupling a transducer ID measurement assembly with a transducer assembly. In block 704, the method 700 includes measuring, by the transducer ID measurement assembly, a plurality of divided voltages between a plurality of configurable ID switches and a reference resistor (for example, RREF 203). In block 706, the method 700 includes determining, with a processor, a distinct ID associated with the transducer assembly based on the plurality of measured divided voltages. In block 708, the method 700 includes retrieving one or more compensation parameters based on the distinct ID. In block 710, the method 700 includes compensating, with the one or more compensation parameters, a measurement signal of the transducer assembly The transducer assembly associated with the method 700 may include a transducer and a plurality of transducer ports coupled with the transducer. The transducer ports may include one or more of a ground return port, a voltage supply port, and/or a signal output port. The transducer assembly may further include a plurality of individually interrogatable ID ports and a plurality of ID resistors. Each of the plurality of ID resistors may be in communication with at least one of the transducer ports, and may be individually coupled to respective ID ports of the plurality of individually interrogatable ID ports. In certain example implementations, the plurality of ID resistors may be utilized to represent a distinct identifier of the transducer.

The various example embodiments of the transducer ID measurement assemblies 200 400 600 associated with the method 700 may include a reference resistor RREF 203 and a plurality of selectable ID ports configured for communication with a respective plurality of ID resistors (for example, ID resistors 104) associated with a transducer 102. The plurality of ID resistors 104 may represent a distinct identifier of the transducer. Certain example implementations of the transducer ID measurement assembly 200 400 600 may also includes a plurality of respective configurable ID switches 202 402 602, each in communication with the reference resistor RREF 203 and individually coupled to respective ID ports of the plurality of selectable ID ports. Certain example implementations of the transducer ID measurement assembly (or assemblies 200 400 600) may further include transducer connection ports, comprising one or more of a ground return connection port, a voltage supply connection port, and/or a signal connection port. In certain example implementations, the transducer connection ports may be configured for coupling with the transducer 102. Certain example implementations of the transducer ID measurement assembly (or assemblies 200 400 600) may be configured to measure and interpret a divided voltage between the plurality of configurable ID switches and the reference resistor RREF 203.

In certain example implementations, the ID resistors may be selected from a group of standard resistance values. In one example implementation, the ID resistors may be metal film type resistors. In other certain example implementations, the ID resistors may be ceramic. In other example implementation, the ID resistors may have a negative temperature coefficient. In certain example implementations, the ID resistors may have a tolerance value of approximately 1%. In certain example implementations, the ID resistors may have a tolerance value of approximately 2%. In certain example implementations, the ID resistors may have a tolerance value of approximately 3%. In certain example implementations, the ID resistors may have a tolerance value of approximately 4%. In certain example implementations, the ID resistors may have a tolerance value of approximately 5%. In accordance with an example implementation of the disclosed technology, the ID resistors may include values between 0Ω and 1 MegΩ. In other example implementations, the ID resistors may include values between 10Ω and 999 KΩ.

According to an example implementation of the disclosed technology, at least one of the plurality of resistors may be a 0Ω short for selectively measuring resistance of one or more associated interconnect leads.

In certain example implementations, each of the plurality of ID resistors is in communication with each of the transducer ports.

In certain example implementations, the transducer is a pressure transducer. In certain example implementations, the transducer is a Wheatstone bridge.

In certain example implementations, the transducer ID measurement circuit can include one or more of a multiplexer (MUX), an amplifier (AMP), an analog-to-digital-converter (ADC), a microprocessor (µP), and a memory. In an example implementation, the transducer ID measurement circuit can further include one or more transducer connection switches configured for selectively configuring circuits among ground return or a voltage supply an one or more of the ground return connection port, the voltage supply connection port, and the signal connection port.

In the foregoing description, numerous specific details have been set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A transducer assembly, comprising:
   a transducer;
   a plurality of individually interrogatable identification (ID) connection points;
   a plurality of fixed ID resistors, each in communication with at least one of a plurality of transducer connection points that are coupled with the transducer, and individually coupled to respective ID connection points of the plurality of individually interrogatable ID connection points;
   wherein the plurality of fixed ID resistors represent a distinct identifier of the transducer without requiring active electronic components in the transducer assembly.

2. The transducer assembly of claim 1, wherein the plurality of transducer connection points that are coupled with the transducer comprise one or more of: a ground return connection point, a voltage supply connection point, and a signal output connection point.

3. The transducer assembly of claim 1, wherein each of the fixed ID resistors are metal film type resistors with 1% tolerance, and with resistance values between 0Ω and 999 kΩ.

4. The transducer assembly of claim 1, wherein at least one of the plurality of fixed ID resistors comprises a 0Ω short for selectively measuring resistance of one or more associated interconnect leads.

5. The transducer assembly of claim 1, wherein each of the plurality of fixed ID resistors is in communication with each of the transducer connection points.

6. The transducer assembly of claim 1, wherein the transducer is a pressure transducer.

7. The transducer assembly of claim 1, wherein the transducer comprises a Wheatstone bridge.

8. The transducer assembly of claim 1, further comprising a transducer identification (ID) measurement assembly, the transducer ID measurement circuit comprising:
   a fixed reference resistor;
   a plurality of selectable ID connection points configured for communication with a respective plurality of fixed ID resistors associated with the transducer assembly;
   a plurality of configurable ID switches, each in communication with the fixed reference resistor and individually coupled to respective ID connection points of the plurality of selectable ID connection points;
   transducer connection points, comprising one or more of a ground return connection point, a voltage supply connection point, and a signal connection point, the transducer connection points configured for coupling with the transducer;
   wherein the transducer identification (ID) measurement circuit is configured to measure and interpret a divided voltage between the plurality of configurable ID switches and the fixed reference resistor.

9. The transducer assembly of claim 8, wherein the transducer ID measurement circuit comprises one or more of a multiplexer (MUX), an amplifier (AMP), an analog-to-digital-converter (ADC), a microprocessor (µP), and a memory.

10. The transducer assembly of claim 8, wherein the transducer ID measurement circuit further comprises one or more transducer connection switches configured for selectively configuring circuits among a ground return or a voltage supply and one or more of the ground return connection point, the voltage supply connection point, and the signal connection point.

11. A transducer identification (ID) measurement assembly, comprising
   a fixed reference resistor;
   a plurality of selectable ID connection points configured for communication with a respective plurality of fixed ID resistors associated with a transducer, wherein the plurality of fixed ID resistors represent a distinct identifier of the transducer;
   a plurality of configurable ID switches, each in communication with the fixed reference resistor and individually coupled to respective ID connection points of the plurality of selectable ID connection points;
   transducer connection points, comprising at least a ground return connection point, a voltage supply connection point, and a signal connection point, the transducer connection points configured for coupling with the transducer;
   wherein the transducer identification (ID) measurement assembly is configured to measure and interpret a divided voltage between the plurality of configurable ID switches and the fixed reference resistor.

12. The transducer ID measurement assembly of claim 11, further comprising one or more of a multiplexer (MUX), an amplifier (AMP), an analog-to-digital-converter (ADC), a microprocessor (µP), and a memory.

13. The transducer ID measurement assembly of claim 11, further comprising one or more transducer connection switches configured for selectively configuring circuits among a ground return or a voltage supply and one or more of the ground return connection point, the voltage supply connection point, and the signal connection point.

14. A system, comprising:
   a transducer assembly, comprising:
      a transducer;
      a plurality of transducer connection points coupled with the transducer, the plurality of transducer connection points comprising one or more of: a ground return connection point, a voltage supply connection point, and a signal output connection point;

a plurality of individually interrogatable identification (ID) connection points;

a plurality of fixed ID resistors, each in communication with at least one of the transducer connection points, and individually coupled to respective ID connection points of the plurality of individually interrogatable ID connection points, wherein the plurality of fixed ID resistors represent a distinct identifier of the transducer; and a transducer identification (ID) measurement assembly, comprising a fixed reference resistor;

a plurality of selectable ID connection points configured for communication with a respective plurality of fixed ID resistors associated with a transducer, wherein the plurality of fixed ID resistors represent a distinct identifier of the transducer;

a plurality of configurable ID switches, each in communication with the fixed reference resistor and individually coupled to respective ID connection points of the plurality of selectable ID connection points; and a plurality of transducer connection points, comprising one or more of a ground return connection point, a voltage supply connection point, and a signal connection point, the plurality of transducer connection points configured for coupling with the transducer; and wherein the transducer identification (ID) measurement assembly is configured to measure and interpret a divided voltage between the plurality of configurable ID switches and the fixed reference resistor.

15. The system of claim 14, wherein each of the fixed ID resistors are metal film type resistors with 1% tolerance, and with resistance values between 0Ω and 999 kΩ.

16. The system of claim 14, wherein at least one of the plurality of fixed ID resistors comprises a 0Ω short for selectively measuring resistance of one or more associated interconnect leads.

17. The system of claim 14, wherein each of the plurality of fixed ID resistors is in communication with each of the plurality of transducer connection points.

18. The system of claim 14, wherein the transducer is a pressure transducer comprising a Wheatstone bridge.

19. The system of claim 14, wherein the transducer ID measurement circuit comprises one or more of a multiplexer (MUX), an amplifier (AMP), an analog-to-digital-converter (ADC), a microprocessor (μP), and a memory.

20. The system of claim 14, wherein the transducer ID measurement circuit further comprises one or more transducer connection switches configured for selectively configuring circuits among a ground return or a voltage supply and one or more of the ground return connection point, the voltage supply connection point, and the signal connection point.

21. A method, comprising:

coupling a transducer identification (ID) measurement assembly with a transducer assembly;

measuring, by the transducer ID measurement assembly, a plurality of divided voltages between a plurality of configurable ID switches and a fixed reference resistor;

determining, with a processor, a distinct ID associated with the transducer assembly based on the plurality of measured divided voltages;

retrieving one or more compensation parameters based on the distinct ID; and compensating, with the one or more compensation parameters, a measurement signal of the transducer assembly.

22. The method of claim 21, wherein:

the transducer assembly, includes:

a transducer;

a plurality of transducer connection points coupled with the transducer, the plurality of transducer connection points comprising at least a ground return connection point, a voltage supply connection point, and a signal output connection point;

a plurality of individually interrogatable identification (ID) connection points;

a plurality of fixed ID resistors, each in communication with at least one of the transducer connection points, and individually coupled to respective ID connection points of the plurality of individually interrogatable ID connection points, wherein the plurality of fixed ID resistors represent a distinct identifier of the transducer; and the transducer identification (ID) measurement assembly, comprises:

a fixed reference resistor;

a plurality of selectable ID connection points configured for communication with a respective plurality of fixed ID resistors associated with a transducer, wherein the plurality of fixed ID resistors represent a distinct identifier of the transducer;

a plurality of configurable ID switches, each in communication with the fixed reference resistor and individually coupled to respective ID connection points of the plurality of selectable ID connection points; and a plurality of transducer connection points, comprising one or more of a ground return connection point, a voltage supply connection point, and a signal connection point, the plurality of transducer connection points configured for coupling with the transducer.

23. The method of claim 21, wherein interpreting distinct ID is determined from n coefficients $c_1, c_2, c_3 \ldots$ corresponding to values of n fixed ID resistors, wherein the distinct ID=$c_1+c_2*N+c_3*N^2+\ldots$, wherein N represents a number of uniquely measurable resistance values from which the fixed ID resistors are selected.

* * * * *